(12) United States Patent  
Guske

(10) Patent No.: US 7,552,578 B2
(45) Date of Patent: Jun. 30, 2009

(54) METHOD AND DEVICE FOR AUTOMATICALLY COUPLING A COMBINE FEEDER INTERFACE AND A COMBINE HEADER

(75) Inventor: William C. Guske, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 560 days.

(21) Appl. No.: 11/483,926

(22) Filed: Jul. 10, 2006

(65) Prior Publication Data

US 2008/0006014 A1    Jan. 10, 2008

(51) Int. Cl.
A01D 34/00    (2006.01)
(52) U.S. Cl. ............... 56/15.6; 56/14.9; 56/16.3
(58) Field of Classification Search ............ 56/12.6, 56/13.5, 14.3–14.7, 14.9–15.3, 15.6, 15.9, 56/16.3, DIG. 9; 180/53.7, 53.8
See application file for complete search history.

(56) References Cited

U.S. PATENT DOCUMENTS

| | | | |
|---|---|---|---|
| 2,869,660 A | 1/1959 | Miller et al. ............... 180/14.4 |
| 3,049,026 A | 8/1962 | Horne et al. ............... 74/665 R |
| 3,324,637 A * | 6/1967 | Windsor et al. .............. 56/15.6 |
| 3,535,859 A | 10/1970 | Adams ........................ 56/10.4 |
| 3,628,317 A | 12/1971 | Lededer ....................... 56/219 |
| 3,672,133 A | 6/1972 | Mestad ....................... 56/13.5 |
| 3,785,130 A | 1/1974 | Gaeddert ....................... 56/98 |
| 3,881,301 A | 5/1975 | Sawyer et al. ................ 56/14.4 |
| 3,911,651 A | 10/1975 | Schreiber ....................... 56/98 |
| 4,090,725 A | 5/1978 | Perin .......................... 172/272 |
| 4,229,932 A | 10/1980 | Persoons et al. ............. 56/13.5 |
| 4,492,292 A | 1/1985 | Thor ........................ 192/69.91 |
| 4,799,563 A | 1/1989 | Yukino ..................... 180/14.4 |
| 4,887,680 A | 12/1989 | Nozaka et al. ............. 180/53.3 |
| 4,972,664 A | 11/1990 | Frey ........................... 56/13.6 |
| 5,052,170 A | 10/1991 | Trenkamp et al. ............. 56/341 |
| 5,303,790 A | 4/1994 | Coleman ................... 180/53.3 |
| 5,339,907 A | 8/1994 | Roth .......................... 172/678 |
| 6,199,355 B1 | 3/2001 | Stiefvater et al. ............ 56/14.9 |
| 6,705,067 B2 | 3/2004 | Schroeder et al. ............ 56/14.6 |
| 7,234,291 B2 * | 6/2007 | Rickert ........................ 56/209 |

* cited by examiner

*Primary Examiner*—Thomas B Will
*Assistant Examiner*—Mai T Nguyen
(74) *Attorney, Agent, or Firm*—Michael G. Harms; John William Stader; Patrick M. Sheldrake

(57) ABSTRACT

An automatic latch assembly for coupling a combine feeder and combine header, said latch comprising a slidable gearbox and a telescopic jack shaft assembly extending therefrom, a hydraulic activation assembly, and spring-loaded couplers.

5 Claims, 6 Drawing Sheets

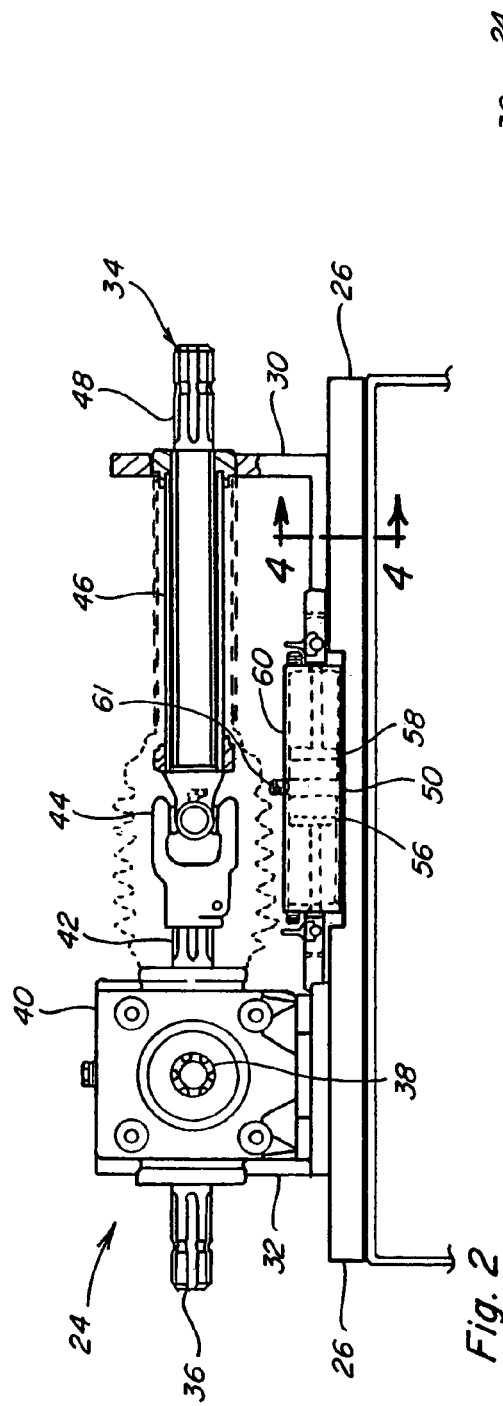
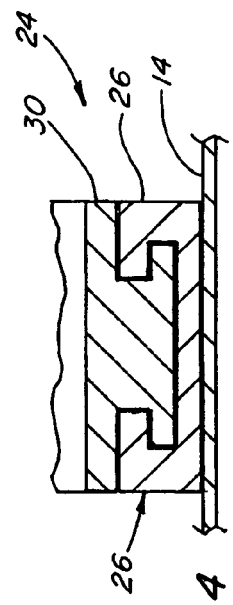
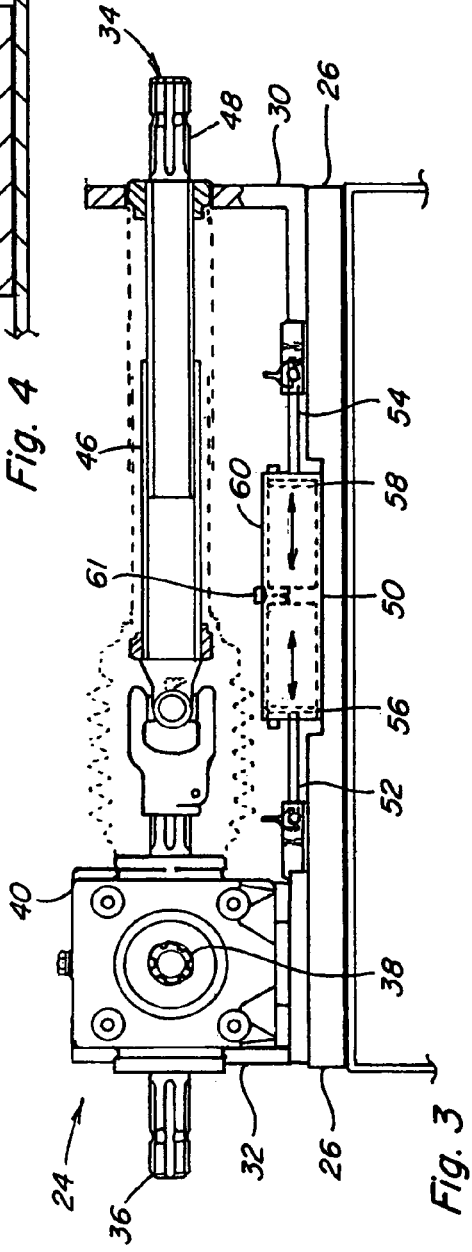
Fig. 2
Fig. 4
Fig. 3

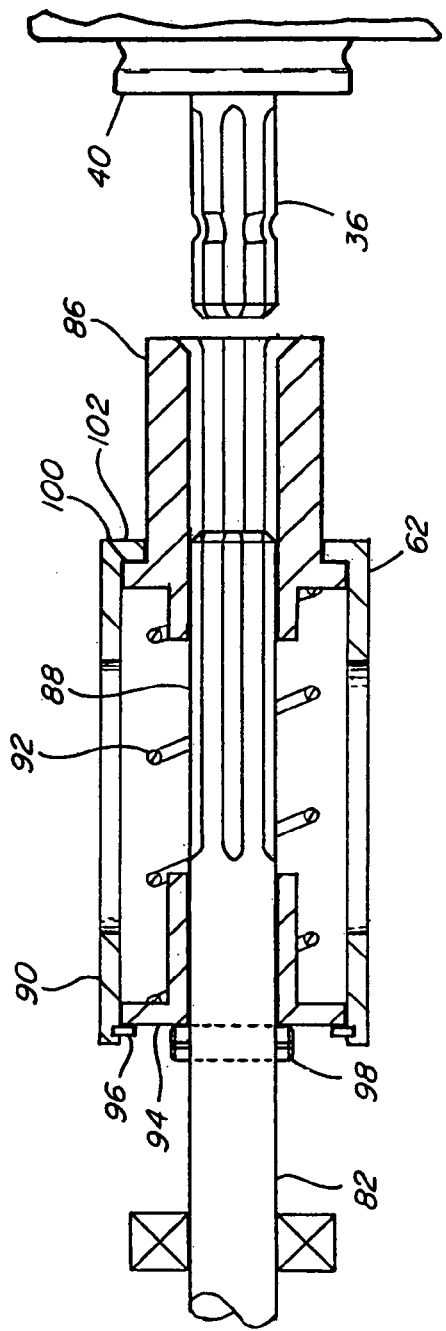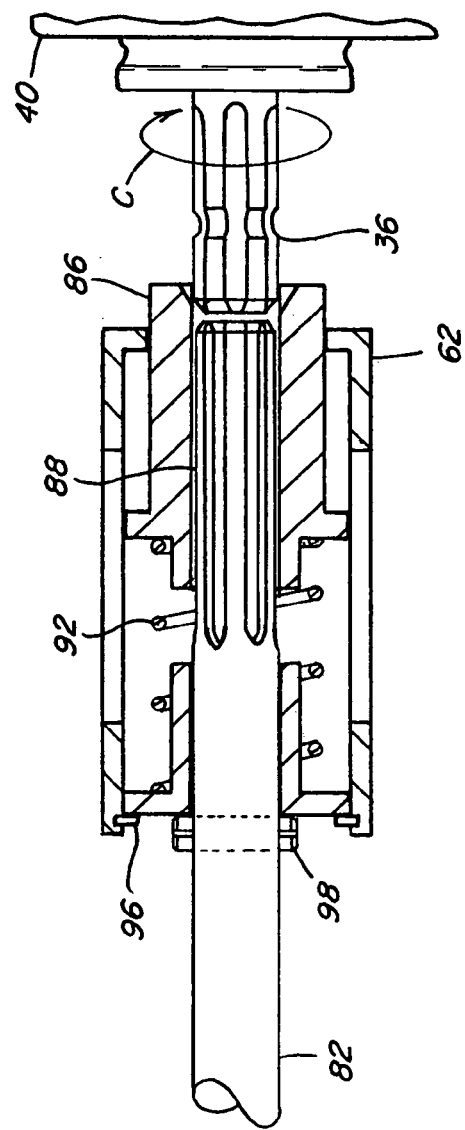
Fig. 6
Fig. 7

METHOD AND DEVICE FOR AUTOMATICALLY COUPLING A COMBINE FEEDER INTERFACE AND A COMBINE HEADER

TECHNICAL FIELD

The present invention relates to the coupling of combine feeder interfaces and combine headers; and it particularly relates to automatically coupling the same.

BACKGROUND ART

The combine harvester, or simply combine, is a machine that harvests, threshes, and cleans grain plants. The combine was originally patented in 1834 by Hiram Moore, the same year as Cyrus McCormick was granted a patent on the mechanical reaper. Early combines, some of which were quite large, were drawn by horse and mule teams and used a bull wheel to provide mechanical power. Tractor-drawn, PTO-powered combines were used for a time. Some combines used shakers to separate the grain from the chaff and straw-walkers to eject the straw while retaining the grain. Tractor-drawn combines evolved to have separate gas or diesel engines to power the grain separation. Today's combines are self-propelled and use diesel engines for power. Rotary designed combines were significant advancements in the art in the late 1970s. Today's combines are equipped with removal heads, or headers, designed for particular crops. There is the standard head or grain platform, which is used for many crops including grain, legumes and many seed crops. There are also wheat heads, dummy heads or pickup headers, specialized corn heads, row crop heads, etc. The headers are all interchangeable and made to fit the particular combine feeder interfaces whereupon the crop can advance through the headers and into the feeder of the combine.

Conventionally, combine feeder housings are equipped with quick-connect coupling mechanisms at the interface of the feeder and the header so as to enable an operator to easily change from one header to another and connect the various feeder shafts to the header drive shafts. Attached to the back of each header are two (left and right of center) quick-connect latches. Attachment of these header latches is accomplished by lowering the combine feeder and driving the combine forward until the feeder interface equipped with two quick-connect yokes contacts the header latches. The raising and lowering of the combine feeder is accomplished by hydraulic cylinders which extend to raise the feeder, allowing the quick-connect yokes to slide up and against the quick-connect latches on the header and thereafter the header can be raised. As the feeder is raised, its weight holds it in place against the quick-connect yokes. The feeder is thereafter locked against the header with manual locking mechanisms set by the operator. When these mechanisms are set to their locked position, the header cannot unhook or fall from the combine feeder. The attachment of the header and feeder is completed by connecting various drive belts and chains that are necessary for the header to operate and by coupling the header drive shafts with the feeder jack shafts manually.

A device in which manual intervention can be avoided during the coupling and uncoupling of the combine feeder and the combine header would be a significant advancement in the art.

SUMMARY OF THE INVENTION

The present invention permits a combine operator to automatically connect the feeder's PTO shaft to the header's drive shafts without leaving the cab of the combine. This is accomplished by a novel automatic latching device. This automatic latching device comprises a gear box with extension shafts, a telescopic jack shaft assembly, and a hydraulic actuator assembly with dual hydraulic cylinders. The gear box and telescopic jack shaft are arranged to be in alignment with and engageable with couplers from either side of the header, when the header is assembled against the feeder adapter interface. The telescopic jack shaft assembly extends from the gear box at one end to engage header couplers at the other end. A smaller jack shaft also extends from the gear box opposite of the telescopic jack shaft assembly and serves to enable coupling a separate header coupling. The coupling can be spring-loaded to handle any drive misalignment, and the coupling also fully engages the header drive shaft upon the slow rotation of the drive shaft. Electronic controls act to sequence the events and prevent either premature engagement or premature disengagement of the latching system.

BRIEF DESCRIPTION OF THE DRAWINGS

FIG. 2 is a frontal view of the device of the present invention, showing the actuator pistons moved centrally to telescopically retract or withdraw the splined jack shaft;

FIG. 3 is another frontal view of the device of the present invention showing the actuator pistons fully opened so as to telescopically expand or extend the splined jack shaft;

FIG. 4 is an end view of the base of the device of the present invention at a cross-section 4-4 from FIG. 2;

FIG. 6 is a cross-section of a coupler for the present invention where the device of the present invention is disengaged;

FIG. 7 is a cross-sectional view of the coupler depicted in FIG. 6 but engaged with the device of the present invention;

DETAILED DESCRIPTION OF THE INVENTION

It should be understood that the detailed description below while indicating preferred embodiments of the invention, is given by way of illustration only, since various changes and modifications within the spirit and scope of the invention will become apparent to those skilled in the art from this detailed description. Embodiments of the invention will be described below with reference to the drawings.

Figure 1:
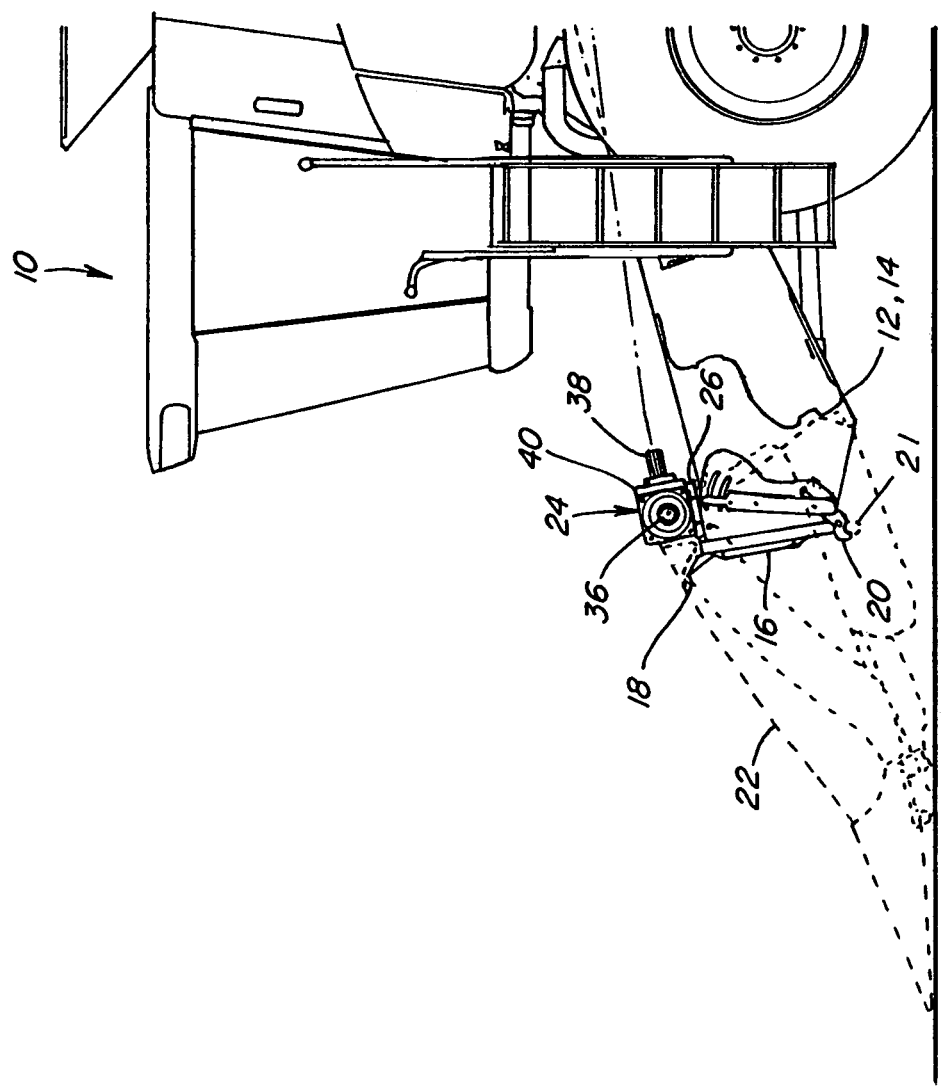
FIG. 1 is a side view of the automatic latching device of the present invention while being mounted atop the feeder/header interface and while having its splined jack shaft disengaged.

Referring now to FIG. 1, gear box 40 of the header/feeder automatic latch device 24 of the present invention is shown mounted on mounting plate 26 which is mounted at the top of the interface between header 22 and feeder housing 14. When connecting the combine feeder 12 to the combine header 22 in the course of the present invention, an operator driver would drive the combine 10 up against header 22 which could be resting on a trailer (not shown), allowing the feeder pickup hook (not shown) to engage a slot in header 22 and allowing quick-connect latch 20 to connect to quick-connect latch pin 21, which would appear on each side of the feeder 12 (in the case of quick-connect latch 20) and header 22 (in the case of quick-connect pin 21). Thus, the inlet end 16 of feeder 12 can receive crop material from header 22 after gear box 40 is electronically and hydraulically activated.

Referring to FIG. 2, the latch 24 is shown in a retracted or withdrawn state prior to activation. Sliding gearbox support 32 and sliding shaft support 30 are adapted to slide laterally along mounting plate 26, but in FIG. 2 are resting in a retracted state withdrawn from the lateral ends of plate 26. Hydraulic double acting activator 50 provides the activation for extending latch 24 along plate 26. Telescoping jack shaft assembly 34 extends through sliding shaft support 30 and connects to universal joint 44 which is connected to upward shaft 42 from gearbox 40. The telescoping jack shaft assembly 34 consists of male splined jack shaft and female splined sleeve shaft 46 which receives shaft 48 telescopically. Activation of the automatic latch apparatus of the present invention begins when hydraulic pressure from oil entering at the fluid input 61 begins to drive pistons 56 and 58 in opposite directions, allowing supports 32 and 30 to slidably extend in opposite directions and resulting in telescopic shaft assembly 34 beginning to slide outward while at the same time the gearbox 40 slides outward in the opposite direction. A cross-section 4-4 of support 30 and mounting plate 26 shows that the two are slidably assembled and permits the action described above. Also, see FIG. 4.

Referring to FIGS. 3 and 4, the automatic latch device 40 of the present invention is fully extended. You will note that supports 32 and 30 have fully extended to the perimeter of mounting plate 26. Additionally, pistons 56 and 58 which are housed within double action cylinder 60 have fully extended from the force of fluid having entered through fluid input 61.

Figure 5:
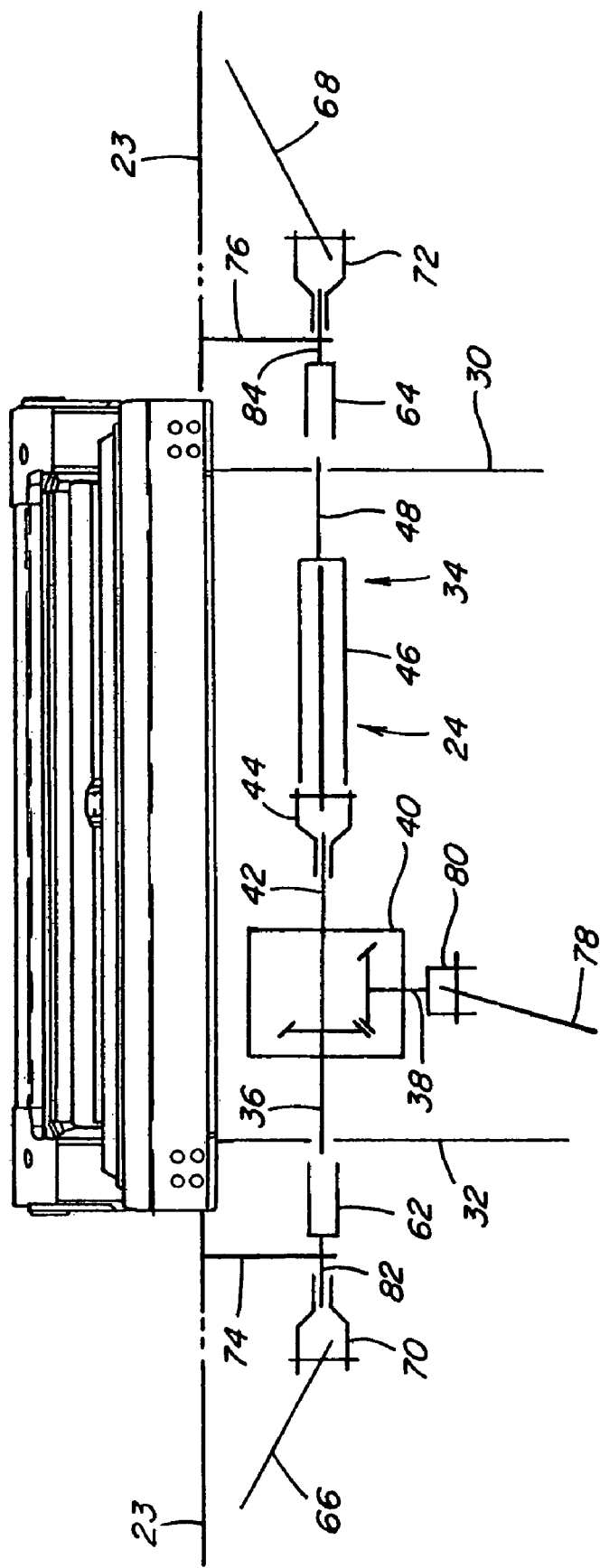
FIG. 5 shows a schematic top view of the device of the present invention having the header drive shaft couplers engaged.
Figure 8:
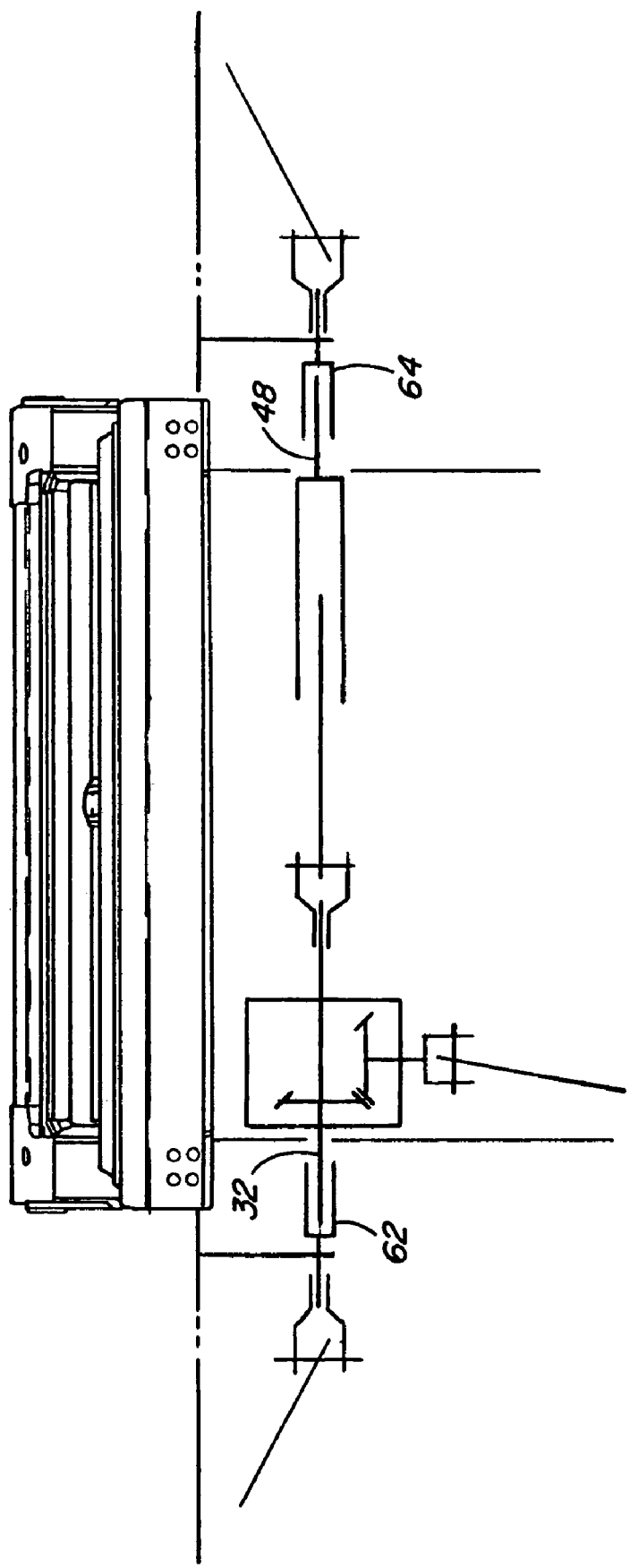
FIG. 8 is a top view of a schematic of the present invention similar to FIG. 5 except that the couplers are engaged rather than disengaged.

A schematic top view of the autolatch is shown in FIG. 5, which furthermore includes the linkages for connecting the drive shafts 66 and 68 of the header interface 23. Autolatch device 24 is shown to be contracted and not yet fully extended to latch the header 22 to the feeder 12. You will note that couplers 62 and 64 have not yet been engaged with shafts 36 and 48, respectively. This is in contrast to FIG. 8 where the latch device 24 is indeed fully extended, engaged and latched, via gearbox 40, and via telescopic shaft 46 sliding outward enabling shafts 36 and 48 to be engaged into couplers 62 and 64.

Referring to FIGS. 1, 6, 7 and 9, the sequence of activating and engaging the auto device 24 into couplers 62 and thus coupling the feeder 12 with the header 22 is shown. FIG. 6 illustrates an initial stage where shaft 36 has not yet been activated or extended. Also note that the female splined sleeve 86 is flush against inner flange 100 of coupler 62. The position of flange 100 is at the top of sleeve 86 which is fitted over shaft 88. Furthermore note that spring 92 has not yet been compressed or biased. Retainer housing 90 and retainer ring 96 are fixed to provide a base for the biasing of spring 92 and roll pin 98, ensuring that there is support along drive shaft 82 for retaining the momentum that will be provided upon activation of and engagement with the shaft 36 extending from and attached to gearbox 40.

Figure 9:
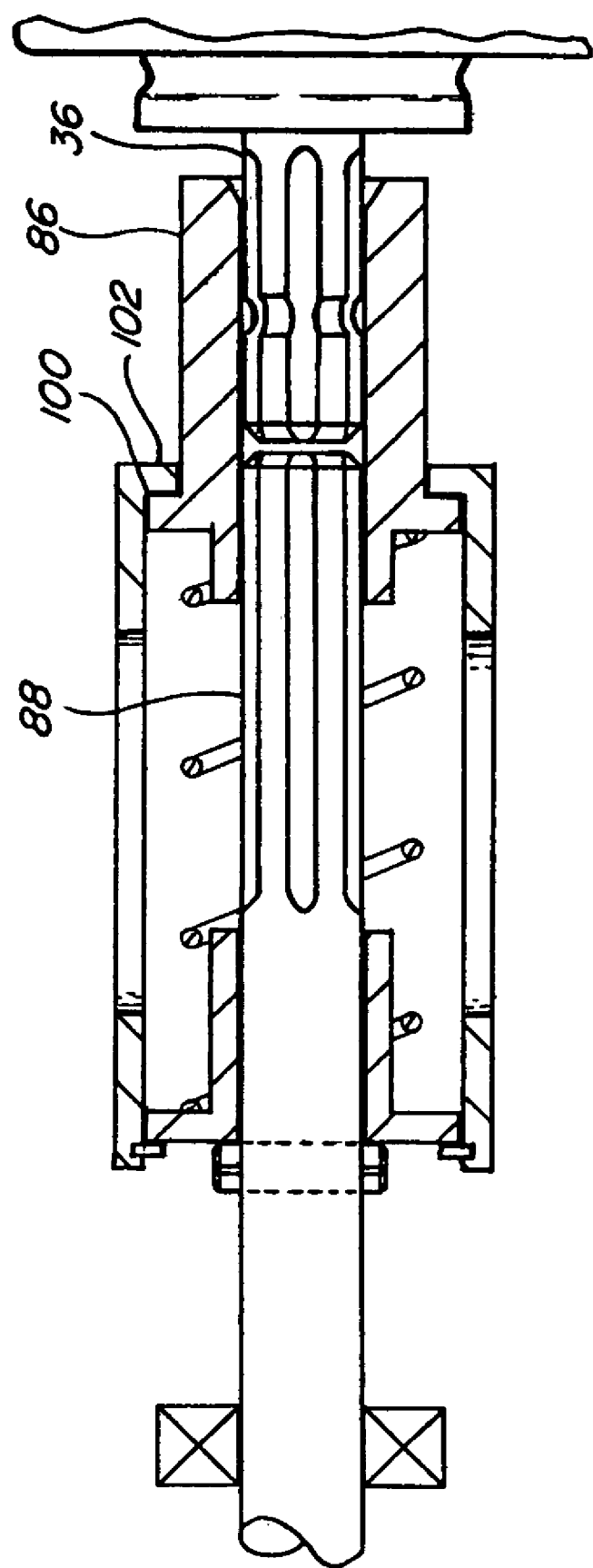
FIG. 9 is a coupler similar to FIGS. 6 and 7 except that the present invention is more fully engaged.

FIG. 7 shows the next stage, or beginning activation. Shaft 36 is now extended into the female splined sleeve 46 and the pressure there from causes sleeve 86 to move laterally against the bias of spring 92, and along the direction of shaft 88. Also shaft 36 now begins to spin in a circle as designated by arrow C until the splines align themselves. Once the splines are aligned, the latching is complete as shown in FIG. 9, where shaft 86 responds to the spring bias and returns flush against flange 100 and outer flange 102, while shaft 36 remains extended into the opening and said shaft 36 almost touches shaft 88.

Although the invention has been described in its preferred form with a certain degree of particularity, it is understood that the structure of the preferred form may be changed in the details of construction, and that the combination and arrangement of parts may be modified without departing from the spirit and scope of the invention as is hereinafter claimed. Particularly note that the position of the automatic device along the interface between the combine feeder 12 and the header 22 is illustrated at its preferred top position of the interface, but could be positioned at other places along the interface.

The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A combine header automatic latch comprising:
an in-line gear box having a telescopically retractable jack shaft extending therefrom and being connected to said gear box by way of a universal joint, and said gear box also having extending therefrom a rotatable jack shaft for coupling to a combine header's first drive shaft, and said telescopically retractable jack shaft also being connectable to a separate coupler for a combine header's second drive shaft, and said gear box having a third jack shaft extending therefrom for connecting to a combine feeder main PTO shaft, said combine header automatic latch being mountable at the interface of the combine header and feeder, and said latch being activated by a double hydraulic cylinder and rod, master-slave assembly, which extends, or in the alternative, retracts or extends the gear box in cooperation with telescopically extending or retracting the telescopically retractable jack shaft, upon the hydraulic activation.

2. The automatic latch of claim 1 having a mounting plate which mounts said latch to the combine header/feeder's interface by brackets which support, at one end, the gear box assembly and at its opposite end, the telescopically retractable jack shaft, and said mounting plate having a channel to slidably receive the hydraulic cylinder and rod assembly for retracting and extending the gear box and the telescopically retractable shaft.

3. The automatic latch of claim 1 having spring loaded couplers for receiving at one end at least one of the first and second drive shafts of the combine headers and at an opposite end at least one of the telescopically retractable and rotatable jack shafts from the latch assembly.

4. The automatic latch of claim 1 having an electronic processor for controlling the sequence of engagement and disengagement of the latch and jack shaft assemblies into header drive shaft coupling devices, said processor controls allowing slow rotation of the drive shafts and jack shafts for use in sensing the full engagement of said shafts and couplers.

5. A method for automatically latching and unlatching a combine feeder and header, said method comprising:
(a) hydraulically activating a double cylinder and rod assembly in opposite directions, said hydraulic activation serving to initiate coupling or uncoupling between an in-line gear box for the feeder and at least one drive shaft for the header, the in-line gear box having a telescopically retractable jack shaft extending therefrom and being connected to said gear box by way of a universal joint, and said gear box also having extending therefrom a rotatable jack shaft for coupling to a combine header's first drive shaft, and said telescopically retractable jack shaft also being connectable to a separate coupler for a combine header's second drive shaft, and said gear box having a third jack shaft extending therefrom for connecting to a combine feeder main PTO shaft, said combine header automatic latch being mountable at the interface of the combine header and feeder, and said latch being activated by the double hydraulic cylinder and rod, master-slave assembly, which extends, or in the alternative, retracts or extends the gear box in cooperation with telescopically extending or retracting the telescopically retractable jack shaft, upon the hydraulic activation, and (b) in turn literally moving the telescopically retractable jack shaft aligned with the gear box into or out of engagement with the combine header's second drive shaft.

* * * * *